United States Patent
Zhao

(10) Patent No.: US 8,941,568 B2
(45) Date of Patent: Jan. 27, 2015

(54) CIRCUIT CAPABLE OF IMPROVING A SHIFT OF GAMMA CURVE RESULTING FROM LED TEMPERATURE RISE AND A DEVICE THEREOF

(75) Inventor: Dengxia Zhao, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 524 days.

(21) Appl. No.: 13/264,866

(22) PCT Filed: Jul. 11, 2011

(86) PCT No.: PCT/CN2011/077045
§ 371 (c)(1),
(2), (4) Date: Oct. 17, 2011

(87) PCT Pub. No.: WO2012/171238
PCT Pub. Date: Dec. 20, 2012

(65) Prior Publication Data
US 2012/0319619 A1 Dec. 20, 2012

(30) Foreign Application Priority Data
Jun. 16, 2011 (CN) .................. 2011 2 0203819 U

(51) Int. Cl.
*G09G 3/36* (2006.01)
*H05B 33/08* (2006.01)

(52) U.S. Cl.
CPC .......... *H05B 33/0866* (2013.01); *Y02B 20/341* (2013.01)
USPC ............................. 345/87; 345/102

(58) Field of Classification Search
USPC .................................. 345/87, 102
See application file for complete search history.

(56) References Cited

U.S. PATENT DOCUMENTS 8,294,738 B2 * 10/2012 Ahn .............................. 345/690
2008/0018569 A1 * 1/2008 Sung et al. ..................... 345/82

* cited by examiner

*Primary Examiner* — Thuy Vinh Tran
(74) *Attorney, Agent, or Firm* — Muncy, Geissler, Olds & Lowe, P.C.

(57) ABSTRACT

The present invention relates to an LCD technology. A circuit used for correcting a shift of the gamma curve because of light emitting diode (LED) temperature rise and a device thereof are proposed. The circuit includes at least one temperature sense resistor, an analog-to-digital converter (ADC), and a lookup table. One end of the temperature sense resistor is connected to the ADC which is connected to the lookup table. The present invention can improve image quality rapidly. The structure of the circuit proposed by the present invention is simple, making it easy to be performed, which is good for energy saving and environmental protection.

11 Claims, 4 Drawing Sheets

CIRCUIT CAPABLE OF IMPROVING A SHIFT OF GAMMA CURVE RESULTING FROM LED TEMPERATURE RISE AND A DEVICE THEREOF

BACKGROUND OF THE INVENTION

1. Field of the Invention

The present invention relates to liquid crystal display (LCD), and more particularly, to a circuit capable of improving a shift of a gamma curve resulting from light emitting diode (LED) temperature rise and a device thereof.

2. Description of the Prior Art

LCDs have gradually become the mainstream in the display device market. An LCD does not generate light itself; instead, lighting components serve as LCD backlights. Light emitting diodes (LEDs) are often used in conventional LCD backlights. LED temperature may rise or fall, depending on the environment where LEDs are used, the duration of use, and so on, leading to a change in luminescence spectra from LEDs. Once the LED temperature rises, the proportions of pixels comprising three sun-pixels of Red, Green, and Blue is changed as well. This will causes a shift of the gamma curve and variations in images, thereby affecting overall viewing quality.

In order to solve the problem that image quality degrades because of a rise in the LED temperature, the conventional technology adopts a hardware circuit. For example, Chinese Patent application No. 200920132222.3 proposes a backlight module and an LCD device and an LCD television set thereof. An LCD panel driving circuit is coupled to a temperature sensor responsive to a sensing signal for regulating driving voltage. The LCD panel is driven based on the regulated driving voltage. However, the problem with the conventional technology lies in the fact that the illumination of LEDs is adjusted indirectly through the driving voltage. Because of this reason, the gamma curve cannot be regulated directly and precisely; image quality cannot be effectively improved, either.

Therefore, it is a considerable need for providing a circuit capable of correcting a shift of the gamma curve resulting from LED temperature rise and a device thereof for solving the problem of the conventional technology described above. The problem is that the illumination of LEDs is adjusted indirectly through the driving voltage, so the gamma curve cannot be adjusted directly and precisely, causing image quality to be unable to be effectively improved.

SUMMARY OF THE INVENTION

It is therefore an object of the present invention to provide a circuit capable of correcting a shift of the gamma curve resulting from LED temperature rise and a device thereof for solving the problem occurring in the conventional technology; that is, the gamma curve cannot be adjusted directly and precisely because the illumination of LEDs is adjusted indirectly through the driving voltage, which is an obstacle to effectively improving image quality.

According to the present invention, a circuit of correcting a shift of the gamma curve resulting from LED temperature rise is provided. The circuit comprises a temperature sense resistor, an analog-to-digital converter (ADC), and a memory. One end of the temperature sense resistor is connected to one end of the ADC, the other end of the ADC is connected to the memory where a lookup table is stored. Information associated with proportions of red, green, and blue in a mix under dynamic LED temperature conditions is stored in the lookup table. The temperature sense resistor detects variations in LED temperature. The ADC outputs values of the variations in LED temperature and assigns the values to a plurality of stages. The information in the lookup table is looked up depending on the LED temperature at the different stages to acquire the information on the proportions of red, green, and blue in the mix under dynamic LED temperature conditions.

In one aspect of the present invention, the circuit further comprises a constant-current generator which is an external circuit connected to one end of the temperature sense resistor.

In another aspect of the present invention, the temperature sense resistor is coated and mounted on a back side of a printed circuit board (PCB).

In still another aspect of the present invention, the circuit comprises at least one temperature sense resistor.

According to the present invention, a circuit of correcting a shift of the gamma curve resulting from LED temperature rise is provided. The circuit comprises a temperature sense resistor, an analog-to-digital converter (ADC), and a memory. One end of the temperature sense resistor is connected to one end of the ADC, and the other end of the ADC is connected to the memory where a lookup table is stored.

In one aspect of the present invention, the circuit further comprises a constant-current generator which is an external circuit connected to one end of the temperature sense resistor.

In another aspect of the present invention, the lookup table stores information associated with proportions of red, green, and blue in a mix under dynamic LED temperature conditions.

In still another aspect of the present invention, the temperature sense resistor is coated and mounted on a back side of a printed circuit board (PCB).

In yet another one aspect of the present invention, the circuit comprises at least one temperature sense resistor.

According to the present invention, a device of correcting a shift of the gamma curve resulting from LED temperature rise is provided. The device comprises a printed circuit board, a temperature sense resistor mounted on the printed circuit board, an analog-to-digital converter (ADC), and a memory. One end of the temperature sense resistor is connected to one end of the ADC, and the other end of the ADC is connected to the memory where a lookup table is stored.

In one aspect of the present invention, the device further comprises a constant-current generator which is an external circuit connected to one end of the temperature sense resistor.

In another aspect of the present invention, the lookup table stores information associated with proportions of red, green, and blue in a mix under dynamic LED temperature conditions.

In still another aspect of the present invention, the temperature sense resistor is mounted on a back side of the printed circuit board.

In yet another one aspect of the present invention, the device comprises at least one temperature sense resistor.

The present invention has advantages or beneficial effects as follows: the present invention provides at least one temperature sense resistor coated and mounted on a printed circuit board (PCB) where LEDs are disposed. The temperature sense resistor detects and senses the LED temperature. An analog-to-digital converter (ADC) outputs values of LED temperature and assigns the values to several stages. Based on information on the proportions of red, green, and blue in the mix, the gamma curve under dynamic LED temperature conditions are adjusted, which effectively improves image quality. The structure of the circuit and device thereof proposed by the present invention is simple, making it easy to be performed, which is good for energy saving and environmental protection.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
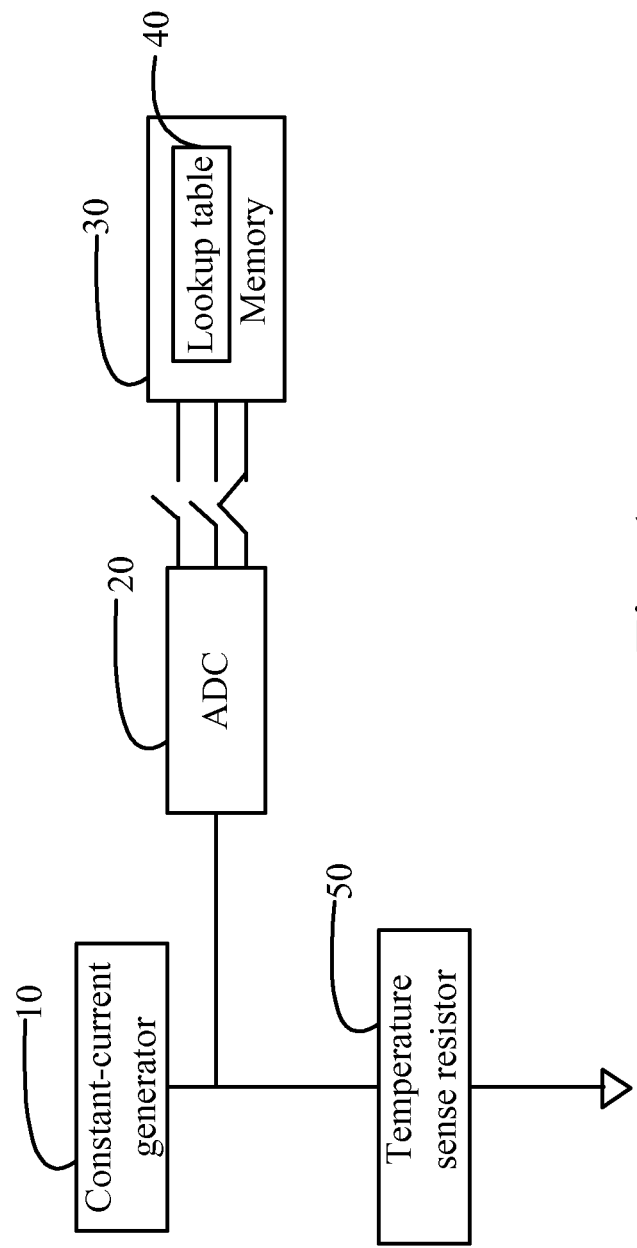
FIG. 1 shows a block diagram of a circuit capable of correcting a shift of the gamma curve resulting from LED temperature rise according to a first preferred embodiment of the present invention.

Referring to FIG. 1, FIG. 1 shows a block diagram of a circuit capable of correcting a shift of the gamma curve resulting from LED temperature rise according to a first preferred embodiment of the present invention. The circuit comprises a constant-current generator 10, an ADC 20, a memory 30, a lookup table 40, and a temperature sense resistor 50. The constant-current generator 10 is an external circuit connected to one end of the temperature sense resistor 50. The other end of the temperature sense resistor 50 is connected to the ADC 20. The ADC 20 is connected to the memory 30 where the lookup table 40 is stored. Information on the proportions of red, green, and blue in the mix under dynamic LED temperature conditions is stored in the lookup table 40.

The temperature sense resistor 50 has a resistance value as a function of temperature which can be simplified as R=R0+f(T)R where R0 indicates a resistance value of the resistor at room temperature, and f(T) indicates a temperature coefficient of the resistor. A reference current Iref is obtained through the external constant-current generator 10. The reference current Iref is irrelevant to the temperature. Once the LED temperature changes, the resistance value of the temperature sense resistor 50 responsible for detecting the LED temperature is varied, leading to the variation in voltage applied on the both ends of the temperature sense resistor 50. The ADC 20 outputs values of the variation in the LED temperature (i.e., values of the actual operating temperature) and assigns these values to different stages. The information in the lookup table 40 is looked up depending on the LED temperature at the different stages to acquire the information on the proportions of red, green, and blue in the mix under dynamic LED temperature conditions by means of which the gamma curve under all LED temperature conditions can be adjusted, thereby improving image quality.

Figure 2:
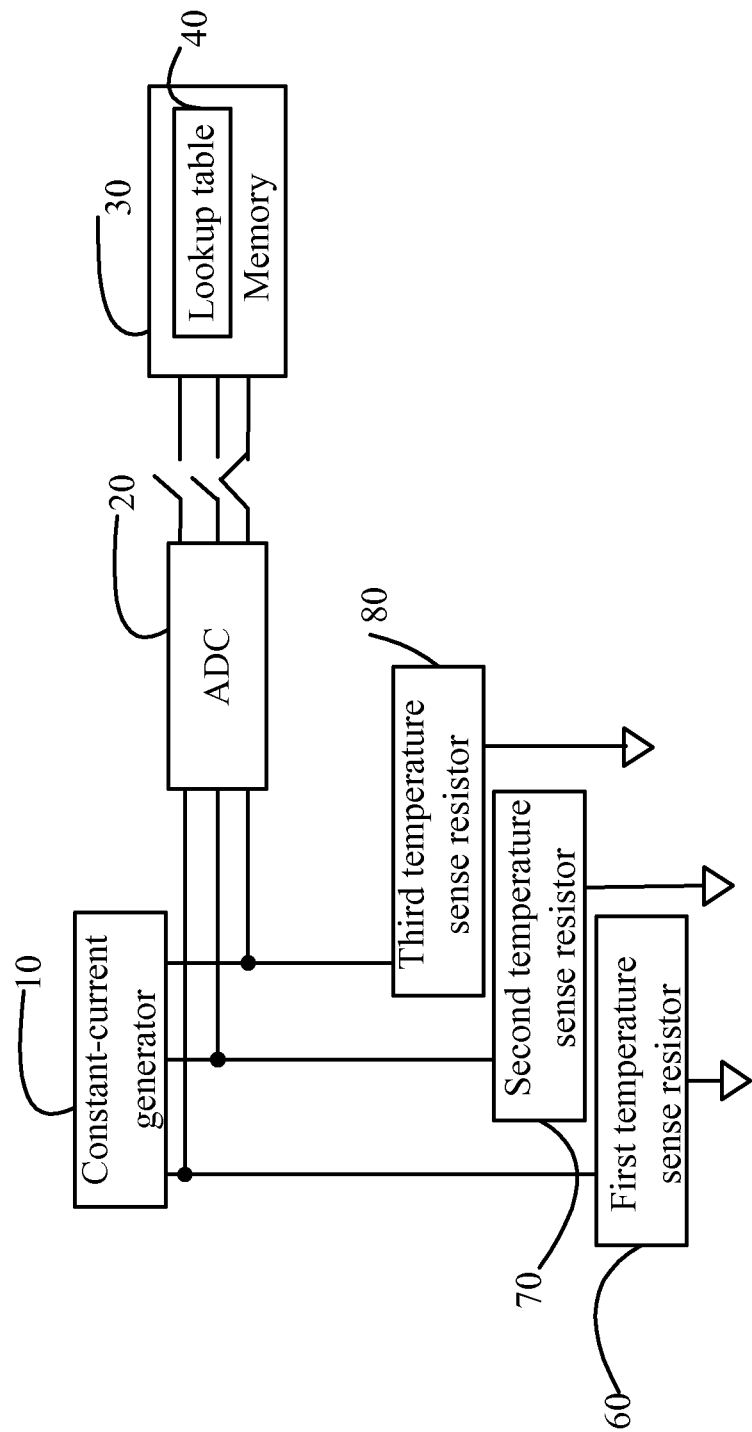
FIG. 2 shows a block diagram of a circuit capable of correcting a shift of the gamma curve resulting from LED temperature rise according to a second preferred embodiment of the present invention.

The circuit must comprise at least one temperature sense resistor 50. Practically, the number of temperature sense resistors 50 can be increased or decreased depending on actual usage. The number of temperature sense resistors 50 determines whether the LED temperature can be precisely detected or not. The more the number of temperature sense resistors 50 is, the more precisely the LED temperature is detected. Referring to FIG. 2, FIG. 2 shows a block diagram of a circuit capable of correcting a shift of the gamma curve resulting from LED temperature rise according to a second preferred embodiment of the present invention. The circuit comprises a constant-current generator 10, an ADC 20, a memory 30, a lookup table 40, a first temperature sense resistor 60, a second temperature sense resistor 70, and a third temperature sense resistor 80. The constant-current generator 10 is an external circuit connected to one end of the first temperature sense resistor 60, of the second temperature sense resistor 70, and of the third temperature sense resistor 80. The other end of each of the temperature sense resistors 60, 70, and 80 is connected to the ADC 20. The ADC 20 is connected to the memory 30 where the lookup table 40 is stored. Information on the proportions of red, green, and blue in the mix under dynamic LED temperature conditions is stored in the lookup table 40.

Each of the temperature sense resistors 60, 70, and 80 has a resistance value as a function of temperature which can be simplified as R=R0+f(T)R where R0 indicates a resistance value of the resistor at room temperature, and f(T) indicates a temperature coefficient of the resistor. A reference current Iref is obtained through the external constant-current generator 10. The reference current Iref is irrelevant to the temperature. Once the LED temperature changes, the resistance value of the temperature sense resistors 60, 70, and 80 responsible for detecting the LED temperature is varied, leading to the variation in voltage applied on the both ends of each of the temperature sense resistors 60, 70, and 80. The ADC 20 outputs values of the variation in the LED temperature (i.e., values of the actual operating temperature) and assigns these values to different stages. The information in the lookup table 40 is looked up depending on the LED temperature at the different stages to acquire the information on the proportions of red, green, and blue in the mix under dynamic LED temperature conditions by means of which the gamma curve under all LED temperature conditions can be adjusted, thereby improving image quality.

Compared with the first preferred embodiment, the second preferred embodiment adopts more temperature sense resistors. This design has advantages of detecting temperature variations in LEDs more sensitively and outputting more accurate values of LED temperature. Therefore, the gamma curve can be adjusted faster and better. The number of temperature sense resistors can be increased or decreased depending on actual usage. In other words, the number is not restricted to the three temperature sense resistors 60, 70, and 80 in the second preferred embodiment.

Figure 3:
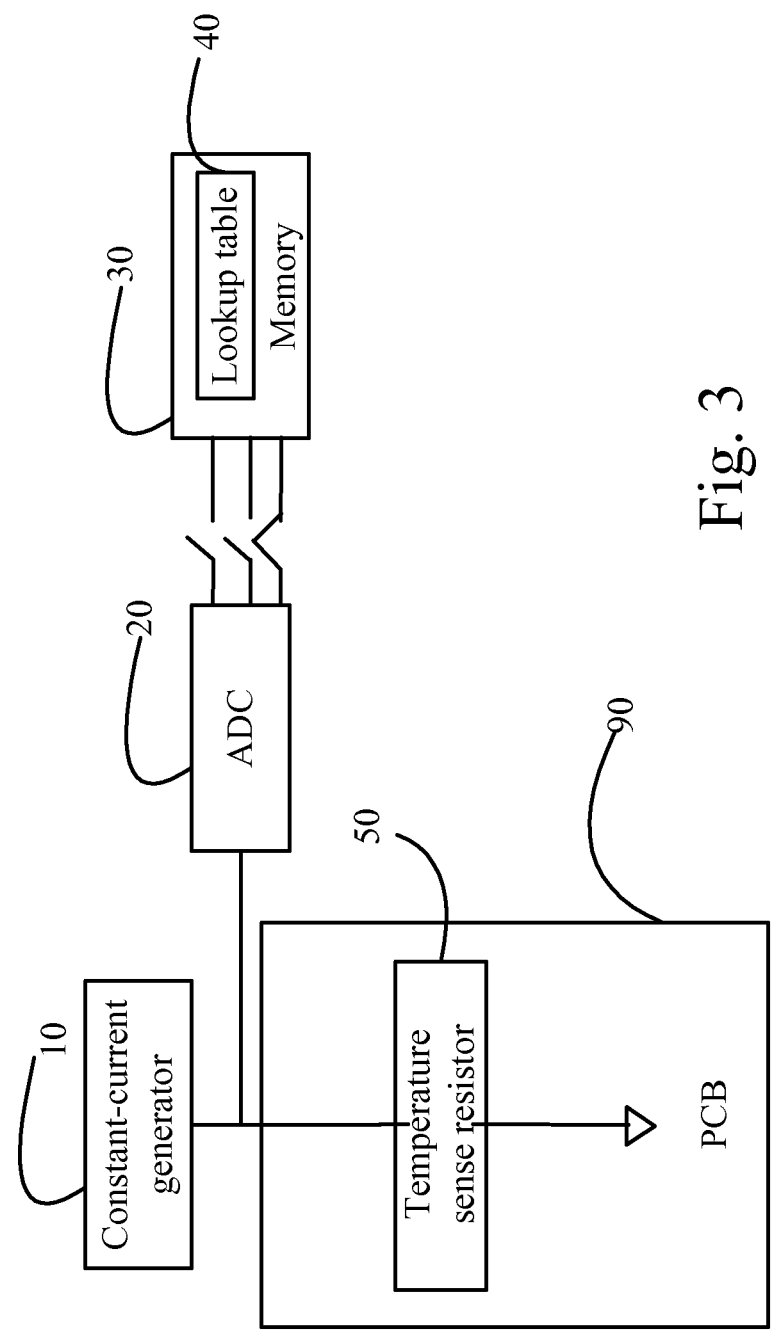
FIG. 3 shows a block diagram of a device capable of correcting a shift of the gamma curve resulting from LED temperature rise according to a first preferred embodiment of the present invention.

Referring to FIG. 3, FIG. 3 shows a block diagram of a device capable of correcting a shift of the gamma curve resulting from LED temperature rise according to a first preferred embodiment of the present invention. The device comprises a constant-current generator 10, an ADC 20, a memory 30, a lookup table 40, a temperature sense resistor 50, and a PCB 90. The temperature sense resistor 50 is coated and mounted on the back side of the PCB 90. The constant-current generator 10 is an external circuit connected to one end of the temperature sense resistor 50. The other end of the temperature sense resistor 50 is connected to the ADC 20. The ADC 20 is connected to the memory 30 where the lookup table 40 is stored. Information on the proportions of red, green, and blue in the mix under dynamic LED temperature conditions is stored in the lookup table 40.

The temperature sense resistor 50 has a resistance value as a function of temperature which can be simplified as R=R0+f(T)R where R0 indicates a resistance value of the resistor at room temperature, and f(T) indicates a temperature coefficient of the resistor. A reference current Iref is obtained through the external constant-current generator 10. The reference current Iref is irrelevant to the temperature. Once the LED temperature changes, the resistance value of the temperature sense resistor 50 responsible for detecting the LED temperature is varied, leading to the variation in voltage applied on the both ends of the temperature sense resistor 50. The ADC 20 outputs values of the variation in the LED temperature (i.e., values of the actual operating temperature) and assigns these values to several stages. The information in the lookup table 40 is looked up depending on the LED temperature at the different stages to acquire the information on the proportions of red, green, and blue in the mix under dynamic LED temperature conditions by means of which the gamma curve under all LED temperature conditions can be adjusted, thereby improving image quality.

In addition, the ADC 20 is directly mounted on the PCB so that space can be greatly saved in another embodiment.

Figure 4:
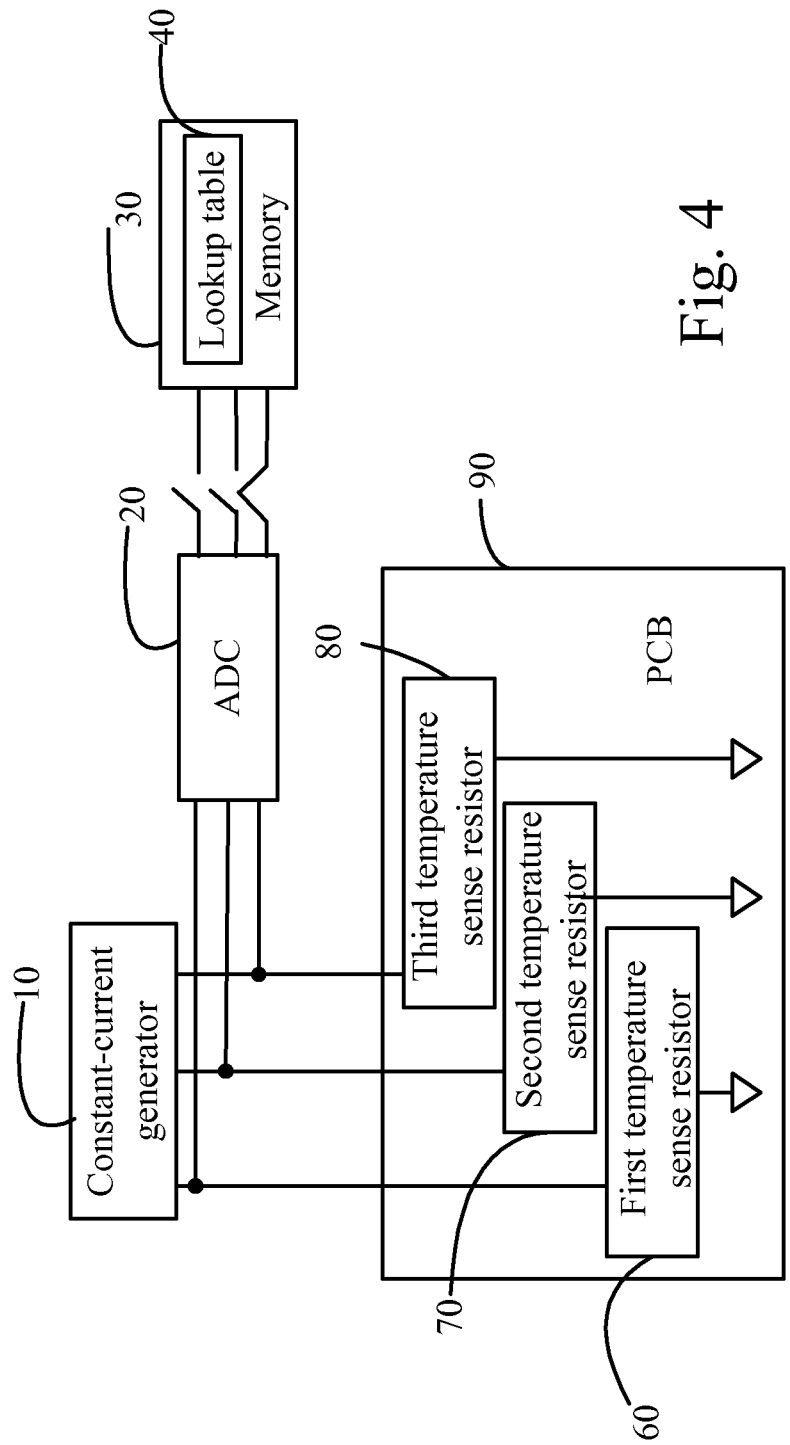
FIG. 4 shows a block diagram of a device capable of correcting a shift of the gamma curve resulting from LED temperature rise according to a second preferred embodiment of the present invention.

Referring to FIG. 4, FIG. 4 shows a block diagram of a device capable of correcting a shift of the gamma curve resulting from LED temperature rise according to a second preferred embodiment of the present invention. The device comprises a constant-current generator 10, an ADC 20, a memory 30, a lookup table 40, a first temperature sense resistor 60, a second temperature sense resistor 70, a third temperature sense resistor 80, and a PCB 90. The constant-current generator 10 is an external circuit. The three temperature sense resistors 60, 70, and 80 are coated and mounted on the back side of the PCB 90. One end of each of the temperature sense resistors 60, 70, and 80 is connected to the constant-current generator 10. The other end of each of the temperature sense resistors 60, 70, and 80 is connected to the ADC 20. The ADC 20 is connected to the memory 30 where the lookup table 40 is stored.

Information on the proportions of red, green, and blue in the mix under dynamic LED temperature conditions is stored in the lookup table 40.

Each of the temperature sense resistors 60, 70, and 80 has a resistance value as a function of temperature which can be simplified as R=R0+f(T)R where R0 indicates a resistance value of the resistor at room temperature, and f(T) indicates a temperature coefficient of the resistor. A reference current Iref is obtained through the external constant-current generator 10. The reference current Iref is irrelevant to the temperature. Once the LED temperature changes, the resistance value of the temperature sense resistors 60, 70, and 80 responsible for detecting the LED temperature is varied, leading to the variation in voltage applied on the both ends of each of the temperature sense resistors 60, 70, and 80. The ADC 20 outputs values of the variation in the LED temperature (i.e., values of the actual operating temperature) and assigns these values to different stages. The information in the lookup table 40 is looked up depending on the LED temperature at the different stages to acquire the information on the proportions of red, green, and blue in the mix under dynamic LED temperature conditions by means of which the gamma curve under all LED temperature conditions can be adjusted, thereby improving image quality.

Compared with the first preferred embodiment, the second preferred embodiment adopts more temperature sense resistors. This design has advantages of detecting temperature variations in LEDs more sensitively and outputting more accurate values of LED temperature. Thus, the gamma curve can be adjusted faster and better. The number of temperature sense resistors can be increased or decreased depending on actual usage. That is, the number is not limited to the three temperature sense resistors 60, 70, and 80 according to the second preferred embodiment. In addition, the ADC 20 is directly mounted on the PCB so that space can be greatly saved according to another embodiment of the present invention.

In the circuit and device thereof provided by the present invention, at least one temperature sense resistor is coated and mounted on a PCB where LEDs are disposed. The temperature sense resistor detects and senses the LED temperature. An ADC outputs values of LED temperature and assigns the values to several stages. Based on information on the proportions of red, green, and blue in the mix under dynamic LED temperature conditions, the gamma curve under dynamic LED temperature conditions are adjusted, which improves image quality. The structure of the circuit and device thereof proposed by the present invention is simple, making it easy to be performed, which is good for energy saving and environmental protection.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A circuit of correcting a shift of the gamma curve resulting from LED temperature rise, characterized in that: the circuit comprises a temperature sense resistor, an analog-to-digital converter (ADC), and a memory, one end of the temperature sense resistor is connected to one end of the ADC, the other end of the ADC is connected to the memory where a lookup table is stored, information associated with proportions of red, green, and blue in a mix under dynamic LED temperature conditions is stored in the lookup table, wherein the temperature sense resistor detects variations in LED temperature, the ADC outputs values of the variations in LED temperature and assigns the values to a plurality of stages, and the information in the lookup table is looked up depending on the LED temperature at the different stages to acquire the information on the proportions of red, green, and blue in the mix under dynamic LED temperature conditions, the circuit further comprises a constant-current generator which is an external circuit connected to one end of the temperature sense resistor.

2. The circuit of claim 1, characterized in that: the temperature sense resistor is coated and mounted on a back side of a printed circuit board (PCB).

3. The circuit of claim 2, characterized in that: the circuit comprises at least one temperature sense resistor.

4. A circuit of correcting a shift of the gamma curve resulting from LED temperature rise, characterized in that: the circuit comprises a temperature sense resistor, an analog-to-digital converter (ADC), and a memory, one end of the temperature sense resistor is connected to one end of the ADC, and the other end of the ADC is connected to the memory where a lookup table is stored, the circuit further comprises a constant-current generator which is an external circuit connected to one end of the temperature sense resistor.

5. The circuit of claim 4, characterized in that: the lookup table stores information associated with proportions of red, green, and blue in a mix under dynamic LED temperature conditions.

6. The circuit of claim 5, characterized in that: the temperature sense resistor is coated and mounted on a back side of a printed circuit board (PCB).

7. The circuit of claim 5, characterized in that: the circuit comprises at least one temperature sense resistor.

8. A device of correcting a shift of the gamma curve resulting from LED temperature rise comprising a printed circuit board, characterized in that: the device further comprises a temperature sense resistor mounted on the printed circuit board, an analog-to-digital converter (ADC), and a memory, one end of the temperature sense resistor is connected to one end of the ADC, the other end of the ADC is connected to the memory where a lookup table is stored, the device further comprises a constant-current generator which is an external circuit connected to one end of the temperature sense resistor.

9. The device of claim 8, characterized in that: the lookup table stores information associated with proportions of red, green, and blue in a mix under dynamic LED temperature conditions.

10. The device of claim 9, characterized in that: the temperature sense resistor is mounted on a back side of the printed circuit board.

11. The device of claim 9, characterized in that: the device comprises at least one temperature sense resistor.

* * * * *